(12) United States Patent
Hebesberger et al.

(10) Patent No.: US 11,236,414 B2
(45) Date of Patent: Feb. 1, 2022

(54) HIGH STRENGTH GALVANNEALED STEEL SHEET AND METHOD OF PRODUCING SUCH STEEL SHEET

(71) Applicants: VOESTALPINE STAHL GMBH, Linz (AT); TOYOTA MOTOR EUROPE NV/SA, Brussels (BE)

(72) Inventors: Thomas Hebesberger, Pasching (AT); Florian Winkelhofer, Kirschberg-thening (AT); Markus Anzenberger, Linz (AT); Edip Oze Arman, Zaventem (BE)

(73) Assignees: VOESTALPINE STAHL GMBH, Linz (AT); TOYOTA MOTOR EUROPE NV/SA, Brussels (BE)

( * ) Notice: Subject to any disclaimer, the term of this patent is extended or adjusted under 35 U.S.C. 154(b) by 685 days.

(21) Appl. No.: 16/064,195

(22) PCT Filed: Nov. 8, 2016

(86) PCT No.: PCT/EP2016/076991
§ 371 (c)(1),
(2) Date: Jun. 20, 2018

(87) PCT Pub. No.: WO2017/108251
PCT Pub. Date: Jun. 29, 2017

(65) Prior Publication Data
US 2018/0371597 A1 Dec. 27, 2018

(30) Foreign Application Priority Data
Dec. 21, 2015 (SE) .................................... 1551681-8

(51) Int. Cl.
*C23C 2/28* (2006.01)
*C23C 2/06* (2006.01)
(Continued)

(52) U.S. Cl.
CPC ................ *C23C 2/28* (2013.01); *B32B 15/01* (2013.01); *B32B 15/013* (2013.01); *B32B 15/04* (2013.01); *B32B 15/043* (2013.01); *B32B 15/18* (2013.01); *C21D 8/0226* (2013.01); *C21D 8/0236* (2013.01); *C21D 8/0263* (2013.01); *C21D 9/60* (2013.01); *C22C 38/00* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01); *C22C 38/26* (2013.01); *C22C 38/28* (2013.01); *C22C 38/32* (2013.01); *C22C 38/38* (2013.01); *C22C 38/58* (2013.01); *C23C 2/02* (2013.01); *C23C 2/06* (2013.01); *C23C 2/26* (2013.01); *C23C 2/40* (2013.01); *C23C 30/00* (2013.01); *C23C 30/005* (2013.01); *C21D 9/46* (2013.01); *C21D 2211/001* (2013.01);
(Continued)

(58) Field of Classification Search
CPC .... C23C 2/28; C23C 2/40; C23C 2/02; C23C 2/06; C23C 2/26; C23C 30/00; C23C 30/005; C22C 38/58; C22C 38/12; C22C 38/00; C22C 38/04; C22C 38/14; C22C 38/22; C22C 38/26; C22C 38/28; C22C 38/32; C22C 38/02; C22C 38/06; C22C 38/38; C22C 38/18; C21D 9/60; C21D 9/46; C21D 8/0226; C21D 8/0236; C21D 8/263; C21D 2211/005; C21D 2211/001; C21D 2211/002; C21D 2211/008; Y10P 10/25; B32B 15/01; B32B 15/013; B32B 15/04; B32B 15/043; B32B 15/18; Y10T 428/26; Y10T 428/12792; Y10T 428/12799; Y10T 428/12951; Y10T 428/12972; Y10T 428/12958

See application file for complete search history.

(56) References Cited

U.S. PATENT DOCUMENTS

2003/0051782 A1  3/2003  Toyooka et al.
2009/0238713 A1  9/2009  Kinugasa et al.
(Continued)

FOREIGN PATENT DOCUMENTS

CN  1199779 A     3/2002
CN  103597100 A   2/2014
(Continued)

OTHER PUBLICATIONS

Machine Translation, Shigeki, et al., JP 2013108154, Jun. 2013. (Year: 2013).*
Korean Office Action dated Mar. 24, 2020, for Korean Patent Application No. 2018-550652.
Chinese Office Action dated Jul. 14, 2020, for Chinese Patent Application No. 201680073111.2.
Chinese Office Action dated Dec. 11, 2019, for Chinese Patent Application No. 201680073111.2.
European Office Action dated Apr. 30, 2020, for European Patent Application No. 16791614.7.
(Continued)

*Primary Examiner* — Michael E. La Villa
(74) *Attorney, Agent, or Firm* — Karceski IP Law, PLLC

(57) ABSTRACT

High strength galvannealed steel sheet having, a) a composition consisting of (in wt. %): C 0.10-0.2, Mn 2.0-3.0, Si 0.2-0.5, Cr 0.1-0.7, Ti 0.01-0.07, Al≤0.2, Nb<0.05, Mo<0.1, optionally B 0.001-0.005, balance Fe apart from impurities, b) a multiphase microstructure comprising (in vol. %) retained austenite 4-20, martensite 5-25, bainitic ferrite ≤10, polygonal ferrite ≤10, balance bainite+tempered martensite 50-90, c) a tensile strength (Rm) 1180-1300 MPa, a yield strength ($R_{p0.2}$) 800-970 MPa, an elongation (A50) ≥8%, or an elongation (A80) ≥6%, and d) a bendability value Ri/t of ≤4 for a sample having the size of 35 mm×100 mm, wherein Ri is the bending radius in mm and t is the thickness in mm of the steel sheet.

9 Claims, No Drawings

(51) Int. Cl.
| | |
|---|---|
| *C23C 2/02* | (2006.01) |
| *C22C 38/32* | (2006.01) |
| *C22C 38/38* | (2006.01) |
| *C22C 38/28* | (2006.01) |
| *C22C 38/26* | (2006.01) |
| *C22C 38/22* | (2006.01) |
| *C22C 38/06* | (2006.01) |
| *C22C 38/02* | (2006.01) |
| *C21D 8/02* | (2006.01) |
| *C22C 38/58* | (2006.01) |
| *C22C 38/12* | (2006.01) |
| *C22C 38/00* | (2006.01) |
| *C22C 38/04* | (2006.01) |
| *C23C 2/40* | (2006.01) |
| *C22C 38/14* | (2006.01) |
| *C21D 9/60* | (2006.01) |
| *B32B 15/01* | (2006.01) |
| *C23C 2/26* | (2006.01) |
| *B32B 15/04* | (2006.01) |
| *C23C 30/00* | (2006.01) |
| *C22C 38/18* | (2006.01) |
| *B32B 15/18* | (2006.01) |
| *C21D 9/46* | (2006.01) |

(52) U.S. Cl.
CPC .. *C21D 2211/002* (2013.01); *C21D 2211/005* (2013.01); *C21D 2211/008* (2013.01); *Y02P 10/25* (2015.11); *Y10T 428/12792* (2015.01); *Y10T 428/12799* (2015.01); *Y10T 428/12951* (2015.01); *Y10T 428/12958* (2015.01); *Y10T 428/12972* (2015.01); *Y10T 428/26* (2015.01)

(56) References Cited

U.S. PATENT DOCUMENTS

| | | |
|---|---|---|
| 2013/0040165 A1 | 2/2013 | Shiraki et al. |
| 2014/0103684 A1* | 4/2014 | Takagi ............... C22C 38/001 296/187.03 |
| 2015/0034218 A1 | 2/2015 | Krizan et al. |
| 2015/0059935 A1 | 3/2015 | Hebesberger et al. |

FOREIGN PATENT DOCUMENTS

| | | |
|---|---|---|
| CN | 103703156 A | 4/2014 |
| CN | 103917681 A | 7/2014 |
| CN | 104169444 A | 11/2014 |
| CN | 104204261 A | 12/2014 |
| CN | 104508163 A | 4/2015 |
| EP | 2785889 | 6/2013 |
| EP | 2738275 A1 | 6/2014 |
| EP | 2757171 A1 | 7/2014 |
| EP | 2881481 A1 | 6/2015 |
| JP | 2011132602 A | 7/2011 |
| JP | 2011241414 A | 12/2011 |
| JP | 2013108154 A | 6/2013 |
| JP | 2015078394 A | 4/2015 |
| JP | 2015117403 A | 6/2015 |
| WO | 2009082091 A1 | 7/2009 |
| WO | 2013125399 A1 | 8/2013 |
| WO | 2013125400 A1 | 8/2013 |
| WO | 2015005191 A1 | 1/2015 |
| WO | 2015092987 A1 | 6/2015 |
| WO | 2015093043 A1 | 3/2017 |

OTHER PUBLICATIONS

International Search Report dated Dec. 15, 2016, for International Patent Application No. PCT/EP2016/076991.
Written Opinion dated Nov. 30, 2017, for International Patent Application No. PCT/EP2016/076991.
International Preliminary Report on Patentability dated Apr. 5, 2018, for International Patent Application No. PCT/EP2016/076991.
Sugimoto et al., "Formability of Al—Nb Bearing Ultra High-strength TRIP-aided Sheet Steels with Bainitic Ferrite and/or Martensite Matrix," ISIJ International, vol. 50 (2010), No. 1, pp. 162-168, (Sep. 29, 2009).
Bendability of Dual Phase steels (DP) and V Bend Test Parameter Optimization, A. Ugar Tuna, Politecnico di Milano: Reference: Matr. 758811, Milan, 2011/2012; Academic year 2012 web link: https://www.politesi.polimi.it/bitstream/10589/42761/1/2012_04_Tuna.pdf.

* cited by examiner

HIGH STRENGTH GALVANNEALED STEEL SHEET AND METHOD OF PRODUCING SUCH STEEL SHEET

CROSS-REFERENCE TO RELATED APPLICATION(S)

This is a National Stage Entry into the United States Patent and Trademark Office from International Patent Application No. PCT/EP2016/076991, having an international filing date of Nov. 8, 2016, which claims priority to Swedish Patent Application No. 1551681-8, filed on Dec. 21, 2015, the entire contents of both of which are incorporated herein by reference.

FIELD OF THE INVENTION

The present invention relates to high strength galvannealed steel sheet suitable for applications in automobiles, construction materials and the like. In particular, the invention relates to cold rolled galvannealed steel sheets having a tensile strength of at least 1180 MPa and an excellent bendability.

BACKGROUND ART

For a great variety of applications increased strength levels are a pre-requisite for light weight constructions in particular in the automotive industry, since car body mass reduction results in reduced fuel consumption.

Automotive body parts are often stamped out of sheet steels, forming complex structural members of thin sheet. However, such parts cannot be produced from conventional high strength steels, because of a too low formability for complex structural parts. For this reason multi phase Transformation Induced Plasticity aided steels (TRIP steels) have gained considerable interest in the last years.

TRIP steels possess a multi-phase microstructure, which includes a meta-stable retained austenite phase, which is capable of producing the TRIP effect. When the steel is deformed, the austenite transforms into martensite, which results in remarkable work hardening. This hardening effect, acts to resist necking in the material and postpone failure in sheet forming operations. The microstructure of a TRIP steel can greatly alter its mechanical properties. The most important aspects of the TRIP steel microstructure are the volume percentage, size and morphology of the retained austenite phase, as these properties directly affect the austenite to martensite transformation, when the steel is deformed. There are several ways in which to chemically stabilize austenite at room temperature. In low alloy TRIP steels the austenite is stabilized through its carbon content and the small size of the austenite grains. The carbon content necessary to stabilize austenite is approximately 1 wt. %. However, high carbon content in steel cannot be used in many applications because of impaired weldability.

Specific processing routs are therefore required to concentrate the carbon into the austenite in order to stabilize it at room temperature. A common TRIP steel chemistry also contains small additions of other elements to help in stabilizing the austenite as well as to aid in the creation of microstructures which partition carbon into the austenite. The most common additions are 1.5 wt. % of both Si and Mn. In order to inhibit the austenite to decompose during the bainite transformation it is generally considered necessary, that the silicon content should be at least 1 wt. %. The silicon content of the steel is important as silicon is insoluble in cementite. US 2009/0238713 discloses such a TRIP steel. However, a high silicon content can be responsible for a poor surface quality of hot rolled steel and a poor coatability of cold rolled steel. Accordingly, partial or complete replacement of silicon by other elements has been investigated and promising results have been reported for Al-based alloy design. However, a disadvantage with the use of aluminium is the rise of the transformation temperature ($A_{c3}$), which makes full austenitizing in conventional industrial annealing lines very difficult or even impossible.

Depending on the matrix phase the following main types of TRIP steels are cited:

TPF TRIP Steel with Matrix of Polygonal Ferrite

TPF steels, as already mentioned before-hand, contain the matrix from relatively soft polygonal ferrite with inclusions from bainite and retained austenite. Retained austenite transforms to martensite upon deformation, resulting in a desirable TRIP effect, which allows the steel to achieve an excellent combination of strength and drawability. Their stretch flangability is however lower compared to TBF, TMF and TAM steels with more homogeneous microstructure and stronger matrix.

TBF TRIP Steel with Matrix of Bainitic Ferrite

TBF steels have been known for long and attracted a lot of interest, because the bainitic ferrite matrix allows an excellent stretch flangability. Moreover, similarly to TPF steels, the TRIP effect, ensured by the strain-induced transformation of metastable retained austenite islands into martensite, remarkably improves their drawability.

TMF TRIP Steel with Matrix of Martensitic Ferrite

TMF steels also contain small islands of metastable retained austenite embedded into strong martensitic matrix, that enables these steels to achieve even better stretch flangability compared to TBF steels. Although these steels also exhibit the TRIP effect, their drawability is lower compared to TBF steels.

TAM TRIP Steel with Matrix of Annealed Martensite

TAM steels contain the matrix from needle-like ferrite obtained by re-annealing of fresh martensite. A pronounced TRIP effect is again enabled by the transformation of metastable retained austenite inclusions into martensite upon straining. Despite their promising combination of strength, drawability and stretch flangability, these steels have not gained a remarkable industrial interest due to their complicated and expensive double-heat cycle.

The formability of TRIP steels is mainly affected by the transformation characteristics of the retained austenite phase, which is in turn affected by the austenite chemistry, its morphology and other factors. In ISIJ International Vol. 50(2010), No. 1, p. 162-168 aspects influencing the formability of TBF steels having a tensile strength of at least 980 MPa are discussed. However, the cold rolled materials examined in this document were annealed at 950° C. and austempered at 300-500° C. for 200 s in salt bath. Accordingly, due to the high annealing temperature these materials are not suited for the production in a conventional industrial annealing line.

Automotive body parts have a high strength and workability but there is a trend towards the use of coated steel in order to increase the corrosion resistance. Hence, there is a need for high strength galvanized and galvannealed (GA) steel sheets having a good bendability for structural parts like side members, side sills and pillars.

WO2015/093043 discloses a galvannealed steel sheet having a tensile strength of at least 1180 MPa. Each of EP 2881481, US 2013/0040165 and WO2015/092987 discloses a galvanized steel sheet having a tensile strength of at least 1180 MPa. EP 2785889 discloses a dual phase (DP) steel having a tensile strength of at least 1180 MPa.

SUMMARY OF THE INVENTION

The present invention is directed to a high strength galvannealed (GA) steel sheet having a tensile strength of at least 1180 MPa and having an excellent bendability and a method of producing the same on an industrial scale. In particular, the invention aims at providing a steel composition that can be processed in an industrial galvannealing plant provided with an inductive galvannealing inductor.

DETAILED DESCRIPTION

The invention is described in the claims.

The steel sheet has a composition consisting of the following elements (in wt. %):

| | |
|---|---|
| C | 0.1-0.2 |
| Mn | 2.0-3.0 |
| Si | 0.2-0.5 |
| Cr | 0.1-0.7 |
| Al | ≤0.2 |
| Ti | 0.01-0.07 |
| Nb | <0.05 |
| Mo | <0.1 |
| optionally | |
| B | 0.001-0.005 | balance Fe apart from impurities.

The importance of the separate elements and their interaction with each other as well as the limitations of the chemical ingredients of the claimed alloy are briefly explained in the following. All percentages for the chemical composition of the steel are given in weight % (wt. %) throughout the description. The amount of hard phases is given in volume % (vol. %). Upper and lower limits of the individual elements can be freely combined within the limits set out in the claims.

C: 0.10-0.2%

C is an element which stabilizes austenite and is important for obtaining sufficient carbon within the retained austenite phase. C is also important for obtaining the desired strength level. Generally, an increase of the tensile strength in the order of 100 MPa per 0.1% C can be expected. When C is lower than 0.1% then it is difficult to attain a tensile strength of 1180 MPa. If C exceeds 0.2%, then weldability is impaired. The upper limit may be 0.19, 0.18 or 0.17%. The lower limit may be 0.11, 0.12, 0.12, 0.14 or 0.15%. A preferred range is 0.14-0.19%.

Mn: 2.0-3.0%

Manganese is a solid solution strengthening element, which stabilises the austenite by lowering the $M_s$ temperature and prevents ferrite and pearlite to be formed during cooling. In addition, Mn lowers the $A_{c3}$ temperature. At a content of less than 2% it might be difficult to obtain a tensile strength of 1180 MPa and the austenitizing temperature might be too high for conventional industrial annealing lines. However, if the amount of Mn is higher than 3%, problems with segregation may occur and the workability may be deteriorated. The upper limit may be 2.99, 2.9, 2.7, 2.6 or 2.5%%. The lower limit may be 2.1, 2.2, 2.3 or 2.4%. A preferred range is 2.3-2.7%.

Si: 0.2-0.5

Si acts as a solid solution strengthening element and is important for securing the strength of the thin steel sheet. However, if the content is too high, then the coatability of the steel sheet deteriorates. The upper limit is therefore 0.5% and may be restricted to or 0.45%. The lower limit may be 0.20, 0.25, 0.30, 0.35 or 0.40%. A preferred range is 0.25-0.45%.

Cr: 0.1-0.7

Cr is effective in increasing the strength of the steel sheet. Cr is an element that forms ferrite and retards the formation of pearlite and bainite. The $A_{c3}$ temperature and the $M_s$ temperature are only slightly lowered with increasing Cr content. Unexpected, the addition of Cr results in a strong increasing amount of stabilized retained austenite. The amount of Cr is limited to 0.7%. The upper limit may be 0.65, 0.60, 0.55 or 0.50%. The lower limit may be 0.15, 0.20, 0.25, 0.30, 0.35 or 0.40%. A preferred range is 0.2-0.6%.

Si+Cr: 0.5-1.1

Si and Cr when added in combination have a synergistic and completely unforeseen effect on the increased amount of residual austenite, which, in turn, results in an improved ductility and bendability. For these reasons the amount of Si+Cr is preferably limited to the range of 0.5 to 1.1%. The lower amount may be 0.55, 0.60, 0.65, 0.70 or 0.75%. The upper limit may be 1.05, 1.0, 0.95, 0.90 or 0.85%.

Ti: 0.01-0.07

Ti is commonly used in low alloyed steels for improving strength and toughness, because of its influence on the grain size by forming carbides, nitrides or carbonitrides. However, the effect tends to be saturated above 0.07%. Therefore, the lowest limit of Ti is 0.01% and may be set to 0.02 or 0.04%. The upper limit is 0.07% and may be set to 0.06, 0.05 or 0.04%. A preferred range is 0.03-0.04%.

Al: ≤0.2

Al promotes ferrite formation and is also commonly used as a deoxidizer. The $M_s$ temperature is increased with an increasing Al content. A further drawback of Al is that it results in a drastic increase in the $A_{c3}$ temperature. For these reasons the Al content is preferably limited to less than 0.1%, most preferably to less than 0.06%.

Nb: <0.05

Nb is commonly used in low alloyed steels for improving strength and toughness, because of its influence on the grain size. Nb increases the strength elongation balance by refining the matrix microstructure and the retained austenite phase due to precipitation of NbC. The steel may contain Nb in an amount of ≤0.05%, preferably ≤0.03%. A deliberate addition of Nb is not necessary according to the present invention. The upper limit may therefore be restricted to ≤0.01%.

Mo: <0.1

Mo can be added in order to improve the strength. However, Mo is normally not deliberately added. The upper limit may therefore be 0.05 or 0.03%.

B: 0.001-0.005

B may optionally be added. B suppresses the formation of ferrite and improves the weldability of the steel sheet. In order to have a noticeable effect at least 0.001% should be added. However, excessive amounts of deteriorate the workability.

Preferred ranges are 0.002-0.005% and 0.0002-0.005%.

The galvannealed steel sheet has a multiphase microstructure comprising (in vol. %)

| | |
|---|---|
| retained austenite | 5-20 |
| martensite | 5-25 |
| bainitic ferrite | ≤10 |

| | |
|---|---|
| polygonal ferrite | ≤10 |
| balance | |
| bainite + tempered martensite | 50-90 |

The amount of retained austenite (RA) is 5-20%, preferably 5-10%. Because of the TRIP effect retained austenite is a pre-requisite when high elongation is necessary. High amount of residual austenite decreases the stretch flangability. The lower amount may be set to 5, 5.5, 6.0, 6.5 or 7%.

Martensite may be present in the final microstructure in an amount of 5-25%. These martensite particles are often in close contact with the retained austenite particles and are therefore called martensite-austenite (MA) particles. The amount of retained austenite was measured by means of the saturation magnetization method described in detail in Proc. Int. Conf. on TRIP-aided high strength ferrous alloys (2002), Ghent, Belgium, p. 61-64.

Bainitic ferrite and polygonal ferrite are not desired microstructural constituents. They are therefore limited to 10% each.

The main part of the microstructure consists of bainite and tempered martensite. These constituents may be difficult to distinguish from each other. Therefore, the total content of both constituents is limited to 50-90%. The amount is normally in the range of 60-80%.

The mechanical properties of the claimed steel are important. The steel has a tensile strength ($R_m$) of 1180-1300 MPa and, optionally, at least one of the following requirements should be fulfilled:

| | |
|---|---|
| a yield strength ($R_{p0.2}$) | 800-970 MPa |
| an elongation ($A_{50}$) | ≥8% |
| an elongation ($A_{80}$) | ≥6% |

The bendability should fulfil a 90° V Bend test value Ri/t≤4 in rolling and transverse directions of the strip for a sample having a width of 30-50 mm, preferably 35 mm and a length of 100 mm, wherein Ri is the bending radius in mm and t is the thickness in mm of the steel sheet.

Preferably, all these requirements are fulfilled at the same time. The lower limit of the yield strength may be set to 810, 820, 830, 840, 850, 860 or 870 MPa.

The $R_m$, $R_{p0.2}$ and $A_{80}$ values are derived according to the European norm EN 10002 Part 1, wherein the samples were taken in the longitudinal direction of the strip. The elongation ($A_{50}$) is derived in accordance with the Japanese Industrial Standard JIS Z 2241: 2011.

The bendability is evaluated by the ratio of the limiting bending radius (Ri), which is defined as the minimum bending radius with no occurrence of cracks, and the sheet thickness, (t). For this purpose, a 90° V-shaped block is used to bend the steel sheet sample in a quasi-static condition (15 mm/min). The preferred sample size is 35 mm×100 mm×t mm. The samples are examined both by eye and under optical microscope with 25 times magnification in order to investigate the occurrence of cracks.

Further information of this testing method can be found in the public-open master thesis document: Bendability of Dual Phase steels (DP) and V Bend Test Parameter Optimization, A. Ugar Tuna, Politecnico di Milano: Reference: Matr. 758811, Milan, 2011/2012; Academic year 2012; web link: https://www.politesi.polimi.it/bitstream/10589/42761/1/2012_04_Tuna.pdf The mechanical properties of the steel sheets of the present invention can be largely adjusted by the alloying composition and the microstructure.

The steel sheets of the present invention can be produced in a conventional industrial annealing line. The processing comprises the steps of:
a) providing a hot rolled steel sheet having a composition as set out in any of the preceding claims,
b) subjecting the hot rolled sheet to pickling,
c) batch annealing the pickled sheet at a temperature of 450-620° C. for a time of 5-20 hours,
d) cold rolling the annealed steel sheet to obtain a thickness reduction of at least 50%,
e) annealing the cold rolled steel sheet in a continuous annealing line at a temperature of 780-870° C. for a time of 30-120 seconds,
f) cooling the steel sheet to a temperature of 350-460° C. a cooling rate of ≤150° C./s,
g) optionally, reheating the steel sheet to 400-500° C.,
h) hot dip galvanizing the steel sheet,
i) galvannealing the sheet at a temperature of 500-600° C.,
j) cooling the galvannealed steel sheet to ambient temperature.

The process shall preferably comprise the following steps:
in step c) the batch annealing temperature may be set to 500-610° C., 520-610° C. or 550-600° C. and the holding time may be 7-15 hours or 8-12 hours,
in step d) the thickness reduction may be 55, 60, 65, 70 or 75%,
in step e) the annealing temperature may be 800-870, 820-860, or 830-860° C. and the holding time may be 30-110, 35-100, 40-90, 40-80 or 40-70 seconds,
in step f) the cooling temperature may be 350-440, 350-420 or 350-400° C. and the cooling rate may be ≤120, ≤110, ≤100, ≤90 or ≤70° C./s,
in step h) it may be preferred to have a zinc bath temperature of 440-480 or 450-470° C., and
in step i) the galvannealing temperature may be 520-580 or 540-560° C.

The present inventors have recognized that the hot rolled sheet needs to be subjected to batch annealing before cold rolling in order to obtain a microstructure, which is necessary for cold-rolling with narrow thickness deviation.

EXAMPLES

A steel having the composition set out below was prepared by conventional steel metallurgy, continuously cast and subjected to hot rolling to a thickness of 3.8 mm.

| | |
|---|---|
| C | 0.169 |
| Mn | 2.4 |
| Si | 0.367 |
| Cr | 0.52 |
| Ti | 0.029 |
| Al | 0.052 |
| Nb | 0.002 |
| Mo | 0.006 |
| B | 0.0046 | balance Fe apart from impurities.

The hot rolled strip was pickled and subjected to batch annealing at a temperature of 550° C. for 10 hours. The steel sheet was thereafter subjected to cold rolling with a thickness reduction of 60% to a final thickness of 1.5 mm. The steel sheet was treated in a continuous galvannealing plant including annealing at 863° C. for 52 seconds, cooling to 390° C., galvanizing in Zn-pot having a temperature of 460° C., galvannealing at 540° C. and cooling to ambient temperature.

The steel sheet thus obtained had a microstructure consisting of 6% retained austenite, 16% martensite and 78% bainite and tempered martensite. The galvannealed steel sheet was subjected to tensile testing and examination of its bendability. The following results were obtained:

| | |
|---|---|
| tensile strength ($R_m$) | 1230 MPa |
| yield strength ($R_{p0.2}$) | 873 MPa |
| elongation ($A_{50}$) | 9.0% |
| bendability (Ri/t) | 3.2 |
| yield ratio ($R_{p0.2}/R_m$) | 0.71 |

Accordingly, the galvannealed steel sheet had a high strength and an excellent bendability.

The material of the present invention can be widely applied to high strength structural parts in automobiles.

The invention claimed is:

1. A high strength galvannealed steel sheet, having:
   a) a steel composition consisting of the following elements (in wt. %):

| | |
|---|---|
| C | 0.10-0.2, |
| Mn | 2.0-3.0, |
| Si | 0.2-0.5, |
| Cr | 0.1-0.7, |
| Ti | 0.01-0.07, |
| Al | ≤0.2, |
| Nb | <0.05, |
| Mo | <0.1, |
| optionally, | |
| B | 0.001-0.005, | and
   balance Fe apart from impurities,
   b) a multiphase microstructure comprising (in vol. %):

| | |
|---|---|
| retained austenite | 5-20, |
| martensite | 5-25, |
| bainitic ferrite | ≤10, |
| polygonal ferrite | ≤10, and |
| balance, | |
| bainite + tempered martensite | 50-90, | c) a tensile strength ($R_m$) 1180-1300 MPa, and optionally,
   at least one of the following mechanical properties:

| | |
|---|---|
| a yield strength ($R_{p0.2}$) | 800-970 MPa, |
| an elongation ($A_{50}$) | ≥8%, and |
| an elongation ($A_{80}$) | ≥6%, | and
   d) a bendability according to a 90° V Bend test value Ri/t of ≤4 for a sample having the size of 35 mm×100 mm, wherein Ri is the bending radius in mm and t is the thickness in mm of the steel sheet.

2. The high strength galvannealed steel sheet according to claim 1, wherein the composition fulfills at least one of:

| | |
|---|---|
| C | 0.14-0.19, |
| Mn | 2.3-2.7, |
| Si | 0.2-0.5, |
| Cr | 0.2-0.6, |
| Si + Cr | 0.5-1.0, |
| Al | ≤0.2, |
| Ti | 0.01-0.05, |
| Nb | <0.03, |
| Mo | <0.05. |

3. The high strength galvannealed steel sheet according to claim 2, wherein the composition further fulfills the following requirement:
   B 0.002-0.004.

4. The high strength galvannealed steel sheet according to claim 1, fulfilling at least one of:

| | |
|---|---|
| retained austenite | 5-15, |
| martensite | 10-20, |
| bainitic ferrite | ≤5, |
| polygonal ferrite | ≤8, |
| bainite + tempered martensite | 60-80, | and
   an elongation ($A_{80}$) ≥8%.

5. The high strength galvannealed steel sheet according to claim 1, wherein the multiphase microstructure comprises (in vol. %):

| | |
|---|---|
| retained austenite | 5-15, |
| martensite | 10-20, |
| bainitic ferrite | ≤5, |
| polygonal ferrite | ≤8, and |
| bainite + tempered martensite | 60-80. |

6. The high strength galvannealed steel sheet according to claim 1, wherein the multiphase microstructure comprises (in vol. %):

| | |
|---|---|
| retained austenite | 5-10, |
| martensite | 10-20, |
| bainitic ferrite | ≤2, |
| polygonal ferrite | ≤2, and |
| bainite + tempered martensite | 60-80. |

7. The high strength galvannealed steel sheet according to claim 1, fulfilling the following requirements:
   a) the steel composition consists of (in wt. %):

| | |
|---|---|
| C | 0.14-0.19, |
| Mn | 2.3-2.7, |
| Si | 0.2-0.5, |
| Cr | 0.2-0.6, |
| Si + Cr | 0.5-1.0, |
| Al | ≤0.2, |
| Ti | 0.01-0.05, |
| Nb | <0.03, |
| Mo | <0.05, and |
| optionally, | |
| B | 0.002-0.004, | and balance Fe apart from impurities,
   b) the multiphase microstructure comprises (in vol. %):

| | |
|---|---|
| retained austenite | 5-15, |
| martensite | 10-20, and |
| bainite + tempered martensite | 60-80, | c) mechanical properties:

| | |
|---|---|
| tensile strength ($R_m$) | 1180-1300 MPa, |
| yield strength ($R_{p0.2}$) | 800-970 MPa, |
| elongation ($A_{50}$) | ≥8%, and |
| elongation ($A_{80}$) | ≥6%, and | d) a bendability according to the 90° V Bend test value Ri/t of ≤4 for a sample having the size of 35 mm×100 mm, wherein Ri is the bending radius in mm and t is the thickness in mm of the steel sheet.

8. A method of producing a high strength galvannealed steel sheet, comprising:
providing a hot rolled steel sheet,
subjecting the hot rolled sheet to pickling,
batch annealing the pickled sheet at a temperature of 450-620° C. for a time of 5-20 hours,
cold rolling the annealed steel sheet to obtain a thickness reduction of at least 50%,
annealing the cold rolled steel sheet in a continuous annealing line at a temperature of 780-870° C. for a time of 30-120 seconds,
cooling the steel sheet to a temperature of 350-460° C.,
optionally, reheating the steel sheet to 400-500° C.,
hot dip galvanizing the steel sheet,
galvannealing the sheet at a temperature of 500-600° C., and
cooling the galvannealed steel sheet to ambient temperature,
wherein the galvannealed steel sheet has:
a) a steel composition consisting of the following elements (in wt. %):

| | |
|---|---|
| C | 0.10-0.2, |
| Mn | 2.0-3.0, |
| Si | 0.2-0.5, |
| Cr | 0.1-0.7, |
| Ti | 0.01-0.07, |
| Al | ≤0.2, |
| Nb | <0.05, |
| Mo optionally, | <0.1, |
| B | 0.001-0.005, | and
balance Fe apart from impurities,
b) a multiphase microstructure comprising (in vol. %):

| | |
|---|---|
| retained austenite | 5-20, |
| martensite | 5-25, |
| bainitic ferrite | ≤10, |
| polygonal ferrite | ≤10, |
| balance, | |
| bainite + tempered martensite | 50-90, | c) a tensile strength ($R_m$) 1180-1300 MPa, and
optionally,
at least one of the following mechanical properties:

| | |
|---|---|
| a yield strength ($R_{p0.2}$) | 800-970 MPa, |
| an elongation ($A_{50}$) | ≥8%, and |
| an elongation ($A_{80}$) | ≥6%, | and
d) a bendability according to a 90° V Bend test value Ri/t of ≤4 for a sample having the size of 35 mm×100 mm, wherein Ri is the bending radius in mm and t is the thickness in mm of the steel sheet.

9. The method of claim 8, wherein the cooling rate is ≤150° C./s.

* * * * *